March 10, 1970     R. R. SCHNEIDER     3,499,338

ANTI-SHOCK LATCH

Filed May 31, 1968     2 Sheets-Sheet 1

INVENTOR.
RALPH R. SCHNEIDER

BY

John B. Sponsler

March 10, 1970  R. R. SCHNEIDER  3,499,338
ANTI-SHOCK LATCH
Filed May 31, 1968  2 Sheets-Sheet 2

INVENTOR.
RALPH R. SCHNEIDER
BY
John B. Sponsler

United States Patent Office 3,499,338
Patented Mar. 10, 1970

3,499,338
ANTI-SHOCK LATCH
Ralph R. Schneider, Roanoke, Va., assignor to General Electric Company, a corporation of New York
Filed May 31, 1968, Ser. No. 733,465
Int. Cl. F16h *21/08*
U.S. Cl. 74—110                                          1 Claim

ABSTRACT OF THE DISCLOSURE

A latching device including a pin retained piston movable axially and resiliently centered within an open-ended cylinder, a lateral surface of the piston being notched near its midpoint to cam one end of a coacting resiliently biased plunger movable transversely through an opening in the cylinder upon displacement of the piston in either direction, the device being mounted with the axis of the cylinder along a three-dimensional diagonal of a member subject to the forces of shock and the other end of the plunger arranged, when cammed, to engage and lock a movable element associated with the member against operation or movement resulting from forces of shock applied to said member.

BACKGROUND OF THE INVENTION

In space vehicles, aircraft, and marine vessels control systems for navigation are frequently complex and sophisticated, such apparatus often including binary-type ("on" and "off") valves, switches and circuit breakers which may be inadvertently caused to operate adversely when such craft are subjected to mechanical shocks. For example, control systems for steering ocean going ships normally have electrical contactors for opening and closing power circuits, these contactors being controlled remotely by solenoids whereby the force of the armature-return springs is overcome to close the contactor. During heavy seas it is possible that the rolling and pitching of the ship may set up enough inertia in the armature of such a device to cause an open contactor to close, or even to cause a closed contactor to open.

Although such contactors and the like may be clamped or otherwise fixed in predetermined operating positions beforehand it is desirable, if not essential for reasons of safety and control, that they be always available for immediate directed operation; consequently, an automatic shock operated mechanism for locking or holding contactors and the like temporarily in their proper stable positions is most essential.

SUMMARY OF THE INVENTION

This invention relates to a mechanism for locking movable elements so that they are not displaced by shock. More specifically, the invention is directed to a latching device automatically operated by shock force to engage and retain a movable element in a predetermined functional position when subjected to such force.

DESCRIPTION OF THE PREFERRED EMBODIMENTS

Figure 1:
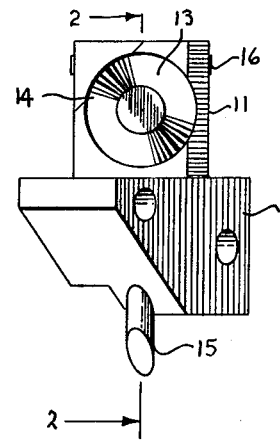
FIG. 1 presents a perspective view showing an anti-shock device according to the invention.

Referring now to FIG. 1, a composite block made up of blocks 11 and 12 having a rod-like piston 13, movable axially within an open-ended cylindrical cavity 14 internal to the block 11, is arranged with the axis of the cavity 14 along a three-dimensional diagonal. The piston 13 normally is centered within the cavity 14. When the piston 13 is moved axially in either direction by shock force, it will cam plunger 15 to an extended position. The movement of piston 13 is limited by a pin 16 fixed in the block 11 and projecting through a cut out portion 18 (see FIG. 2) in piston 13.

Figure 2:
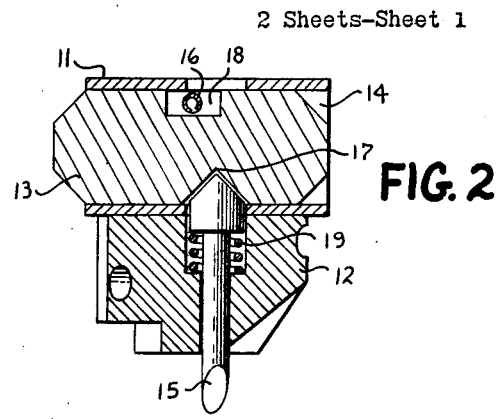
FIG. 2 is a sectional view of FIG. 1 along the line 2—2.

Referring now to FIG. 2, axial movement of piston 13 causes a notch 17 in piston 13 to cam plunger 15 to extend from block 12 compressing a spring 19. The axial movement of piston 13 is limited by pin 16 for retaining the non-protruding end of plunger 15 within notch 17. Upon cessation of shock, spring 19 urges plunger 15 into the notch 17 to cam piston 13 to its normal position within cavity 14.

Figure 3:
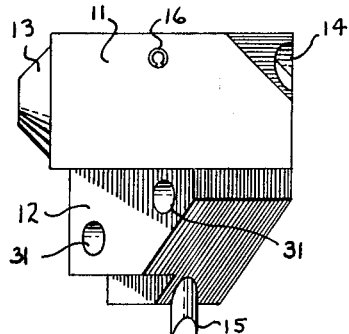
FIG. 3 is a side view of FIG. 1.

Referring now to FIG. 3, the location of pin 16 as it is fixed in block 11 is illustrated. Mounting holes 31 are also shown as oriented on block 12.

Figure 4:
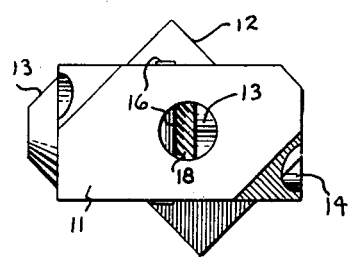
FIG. 4 is a top view of FIG. 3.

Referring now to FIG. 4, the angular arrangement of block 11 is shown as positioned on block 12. The angular arrangement of block 11 in conjunction with the slanted mounting of block 12 (see FIG. 3) are utilized to achieve the three-dimensional diagonal positioning of cavity 14.

Figure 5:
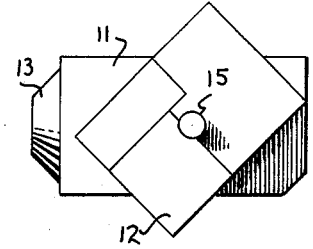
FIG. 5 is a bottom view of FIG. 3.

Referring now to FIG. 5, the view illustrated also shows the relative positioning of blocks 11 and 12. Plunger 15 is extensible from this section of the anti-shock device.

Figure 6:
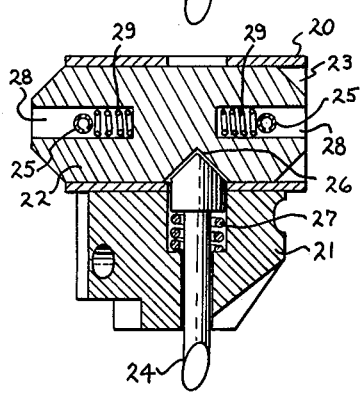
FIG. 6, a sectional view similar to FIG. 2, presents an alternative embodiment of the invention.

Referring now to FIG. 6 which presents another embodiment of the invention, a composite block made up of blocks 20 and 21 having a piston 22, movable axially within an open-ended cylindrical cavity 23 internal to the block 20 is arranged with the axis of the cavity 23 along a three-dimensional diagonal. The piston 22 normally is centered within the cavity 23. When the piston 22 is moved axially in either direction by shock force, it will cam plunger 24 to an extended position. The movement of piston 22 is limited by pins 25 near each end of block 20. Axial movement of piston 22 causes a notch 26 in piston 22 to cam plunger 24 to extend from block 20 compressing a spring 27. The axial movement of piston 22 is limited by pins 25 extending transversely through slots 28 in each end of piston 22 for retaining the non-protruding end of plunger 24 within notch 26. Upon cessation of shock, spring 27 urges plunger 24 into notch 26 to cam piston 22 to its normal central position within cavity 23. The centering action is assisted by springs 29 confined within slots 28 and inwardly abutting pins 25 urging piston 22 centrally within the cavity 23.

Figure 7:
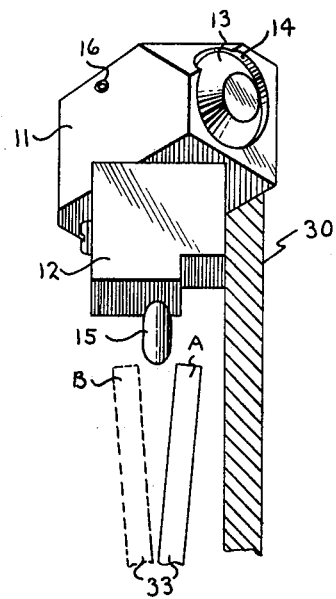
FIG. 7 is a perspective view illustrating an application for the anti-shock device.

Referring now to FIG. 7, a specific use of the anti-shock latch is illustrated wherein composite blocks 11 and 12 are mounted on an electrical contactor 30 (shown in part) aligned so that plunger 15, when extended will lock in place an armature or movable element 33. Element 33, upon shock exposure, will be locked in either position A or B (depending on its location) for the duration of shock.

While there has been described at present what are throught to be preferred embodiments of the present invention, variations and modifications may occur to those skilled in the art.

I claim:
1. A device for locking and retaining a movable member subjected to forces of shock comprising a composite mounting block having an open-ended, cylindrical cavity aligned along a three-dimensional diagonal in said block, a V-notched piston axially slidable within said cavity, resilient means for centering said piston in said cavity, said piston having a mass of sufficient magnitude to overcome said resilient means under forces of shock, and a spring-urged plunger coacting with the notched portion of said piston projected from said block to engage said movable member when said piston moves off center.

References Cited

UNITED STATES PATENTS 618,708  1/1899  Merwin _____ 74—110

MILTON KAUFMAN, Primary Examiner
WESLEY S. RATLIFF, Jr., Assistant Examiner